United States Patent [19]
Dale et al.

[11] Patent Number: 5,200,485
[45] Date of Patent: Apr. 6, 1993

[54] PROCESS FOR OBTAINING COPOLYMERS WITH A VERY LOW CONTENT RESIDUAL BUTADIENE USING AND INERT GAS PURGE

[75] Inventors: William J. Dale, Scarborough; George Liebermann, Mississauga, both of Canada; Richard L. McQueen, Oklahoma City, Okla.

[73] Assignee: Xerox Corporation, Stamford, Conn.

[21] Appl. No.: 612,668

[22] Filed: Nov. 14, 1990

[51] Int. Cl.$^5$ .............................................. C08F 236/6
[52] U.S. Cl. ................... 526/340; 526/340.1; 528/483
[58] Field of Search .............. 528/483; 526/340, 340.1

[56] References Cited

U.S. PATENT DOCUMENTS

| | | | |
|---|---|---|---|
| 2,432,386 | 12/1947 | Craig | 202/46 |
| 3,683,511 | 8/1972 | Johnson et al. | 528/483 |
| 4,080,492 | 3/1978 | de Zarauz | 526/177 |
| 4,169,828 | 10/1979 | Wright | 525/264 |
| 4,170,699 | 10/1979 | Wright | 526/215 |
| 4,237,257 | 12/1980 | Moriya et al. | 526/230.5 |
| 4,525,560 | 6/1985 | Smith | 526/201 |
| 4,558,108 | 12/1985 | Alexandru et al. | 526/340 |

FOREIGN PATENT DOCUMENTS 0115704 12/1982 European Pat. Off. .

Primary Examiner—Joseph L. Schofer
Assistant Examiner—Tom Weber
Attorney, Agent, or Firm—Kenyon & Kenyon

[57] ABSTRACT

A process for forming a copolymer of butadiene and other monomers such as styrene is disclosed wherein the final product is characterized by a low residual butadiene content. The process comprises: (a) charging a reaction vessel with butadiene and styrene; (b) initiating said copolymerization reaction; (c) after the exotherm phase of said reaction, purging said reaction vessel with an inert gas while heating said reaction vessel to a final polymerization temperature.

7 Claims, 4 Drawing Sheets

PROCESS FOR OBTAINING COPOLYMERS WITH A VERY LOW CONTENT RESIDUAL BUTADIENE USING AND INERT GAS PURGE

BACKGROUND OF THE INVENTION

In modern electrophotographic equipment, toner particles are automatically recycled many thousands of times over image surfaces while the particles are moving at an extremely high velocity. Further, toner particles, which are deposited in image configurations, must now be fused in extremely short periods of time. Thus, it is necessary for toner materials to possess the proper triboelectric charging properties for electrostatic latent image development and furthermore, they must not agglomerate during storage and transportation. Thus, it is necessary for the toner to endure the harsh environment of high speed electrostatographic copiers and duplicators and be capable of fusion at lower energy levels.

Polymers have been developed which exhibit properties meeting the stringent standards of advanced copiers and duplicators. An example of a copolymer used for a toner is a copolymer of styrene-butadiene. Such copolymers of styrene-butadiene may be made by various techniques such as solution and emulsion polymerization, however, suspension polymerization has been found to be the most suited for forming copolymers for use in toners. Toners may also be produced by other methods. For example, copending U.S. patent application Ser. No. 548,328, now U.S. Pat. No. 5,155,193, filed Jul. 2, 1990, "Suspension Free Polymerization Process and Toner Composition Thereof", which is incorporated in its entirety herein by reference, discloses a suspension free radical polymerization process.

The styrene-butadiene suspension polymerization process as described in U.S. Pat. No. 4,558,108 (the '108 patent), which is incorporated herein in its entirety by reference, uses a series of depressurizations/repressurizations ("venting") of the reactor headspace in order to reduce the residual butadiene in the polymer to levels which are environmentally acceptable. The '108 patent discloses a process for forming in a reaction vessel a copolymer of styrene and butadiene in which there is provided an aqueous suspension phase comprising water, styrene monomer, butadiene monomer, a suspension stabilizing agent, and a chain propagating amount of a free radical polymerization initiator which is insoluble in water, soluble in the styrene monomer, soluble in the butadiene monomer and having a 1 hour half-life between about 50° C. and about 130° C., the ratio of the styrene monomer to the butadiene monomer being between about 80:20 and about 95:5 by weight, the weight proportion of water to the combination of the styrene monomer and the butadiene monomer being between about 0.8:1 and about 2:1, and wherein the suspension stabilizing agent consists essentially of a finely-divided, difficultly water-soluble powder; and a vapor phase comprising an inert gas and butadiene monomer. In the process the aqueous phase and the vapor phase are heated to a temperature between about 50° C. and about 130° C. at a pressure between about 20 psi and about 140 psi until at least about 90 percent by weight of the styrene monomer and the butadiene monomer are copolymerized to form an aqueous suspension of discrete polymer particles having a Tg value of between about 45° C. and about 65° C., a weight average molecular weight of between about 10,000 and about 400,000, a molecular weight distribution of the copolymer between about 2 and about 9 and a butadiene monomer concentration of less than about 10 parts per million by weight. During the process, butadiene monomer is removed from the vapor phase, by venting and repressurization of the reactor vessel, after at least about 75 percent by weight of the butadiene monomer and the styrene monomer in the aqueous phase have been converted to a copolymer and prior to conversion of more than about 98 percent by weight of the butadiene monomer and the styrene monomer to a copolymer in the aqueous phase.

FIG. 1 represents the standard time/temperature/pressure profile of '108 patent venting process. The steps of the prior process are as follows: First, the reactants are charged in a reactor ("charge phase"; labelled "A" in FIG. 1). The reaction is initiated and continues exothermically ("exotherm phase"; labelled "B" in FIG. 1) with an initial increase in pressure and temperature, after which the temperature is maintained at a polymerization temperature of 95° C. In the preferred embodiment of the '108 patent, about 165 minutes after the start of the exotherm phase, the reactor is vented ("venting phase"; labelled "C" in FIG. 1) with a concomitant decrease in pressure resulting in foam formation in the reactor. The vent is then closed and the pressure is increased until the foam disappears. This depressurization/repressurization venting procedure is repeated several times for approximately 30 minutes. The temperature of the reaction vessel is then raised over a 40 minute period ("heat-up phase"; labelled "D" in FIG. 1) to 125° C. to complete the reaction process. After maintaining the high polymerization temperature for approximately 75 minutes ("high temperature phase"; labelled "E" in FIG. 1), the reactor is then cooled ("cool-down phase"; labelled "F" in FIG. 1) for approximately 100 minutes, thus bringing the total reaction time to approximately 400 minutes.

Although the method of the '108 patent produces polymer with an acceptable level of residual butadiene, the depressurization/repressurization venting procedure creates some inconvenient processing characteristics, such as:

1) the venting procedure delays the process about 30 minutes before the heat-up phase can begin;

2) foam generation during the depressurization cycles can create disturbances which adversely effect the efficiency of the process;

3) extensive above liquid level fouling of the reactor and reactor appurtenances due to foaming can take place. This is believed to be a major factor in necessitating frequent reactor cleaning.

Each of these characteristics of the '108 patent process increases the cost and decreases the efficiency of the polymerization process. Other processes for making these and similar types of polymers exhibit similar inconveniences.

It would therefore be desirable to provide a process for polymerization which produces acceptable levels of residual butadiene in the resultant polymer, while overcoming these inconveniences of prior methods.

SUMMARY OF THE INVENTION

The present invention addresses the above-mentioned problems by avoiding the depressurization/repressurization cycle venting procedure and instead using an inert gas purge which is timed to begin after a substantial selected degree of polymerization has occurred and then is maintained for a period and rate necessary to reduce the butadiene content in the polymer to a very low level. In addition to avoiding the foam formation and the resultant reactor fouling, the purge is applied during the heat up phase, thus eliminating "non-productive" process time associated with prior methods. Further, the purge procedure is not limited to 30 minutes and the purge can be extended to control the residual butadiene levels in the copolymer and thus achieve lower butadiene levels.

The present invention stems in part from the observation that when practicing the process of the '108 patent, the polymerization exotherm subsides at approximately 135 minutes after the beginning of the reaction thus indicating a high degree of conversion. Holding the temperature constant for an additional 30 minutes was necessary only to allow completion of the prescribed series of depressurization and repressurization to remove residual butadiene. It was discovered that altering the pressure profile during the standard venting procedure would (1) prevent fouling of the reactor above liquid level by eliminating foaming in the reaction vessel and the resultant transport and deposition of polymer on reactor internals and (2) achieve an acceptable level of residual unreacted butadiene in the polymer product.

A process for forming a copolymer of butadiene and styrene is disclosed. The process comprises charging a reaction vessel with butadiene, styrene and possibly other comonomers, together with all other ingredients necessary for the copolymerization reaction; initiating the copolymerization reaction; permitting the reaction to continue for a selected period of time; and thereafter purging the reaction vessel with an inert gas for a limited period of time until the residual unreacted butadiene is substantially removed. The reaction vessel is heated to a final polymerization temperature during the purging step. The purging preferably occurs after the exotherm phase of the reaction has been completed. Most preferably, the reaction vessel is purged after at least about 75 percent by weight the butadiene and the styrene are converted to a copolymer. The purging is therefore used only after a pre-selected conversion. After the reaction vessel is heated to its final polymerization temperature, the reaction vessel is cooled and polymer is collected.

In the preferred embodiment of the invention, a continuous inert gas purge allows for a reduction in reactor cycle time by eliminating the depressurization/repressurization procedure of approximately 30 minutes, for example, without introducing a new component in the batch formulation. Foam production is virtually eliminated, thus reducing reactor fouling and increasing the number of batches run between reactor cleanings. This invention further eliminates reaction time as the purge is employed during the heat-up phase of the reaction.

Application of the process of the invention to reduce reaction cycle time, control residual butadiene levels and eliminate reactor foaming is not limited to a toner resin production process; it can be used in other styrene-butadiene copolymerization processes, as well as other butadiene copolymerization processes.

In all the Figures, (1) time "O" minutes is indicated for each curve by "$T_o$", and (2) the various phases of the depicted process are labelled as follows: charge phase ("A"), exotherm phase ("B"), venting phase ("C"), heat up phase ("D"), high temperature phase ("E"), cool down phase ("F"), and purge phase ("G").

DETAILED DESCRIPTION

Figure 1:
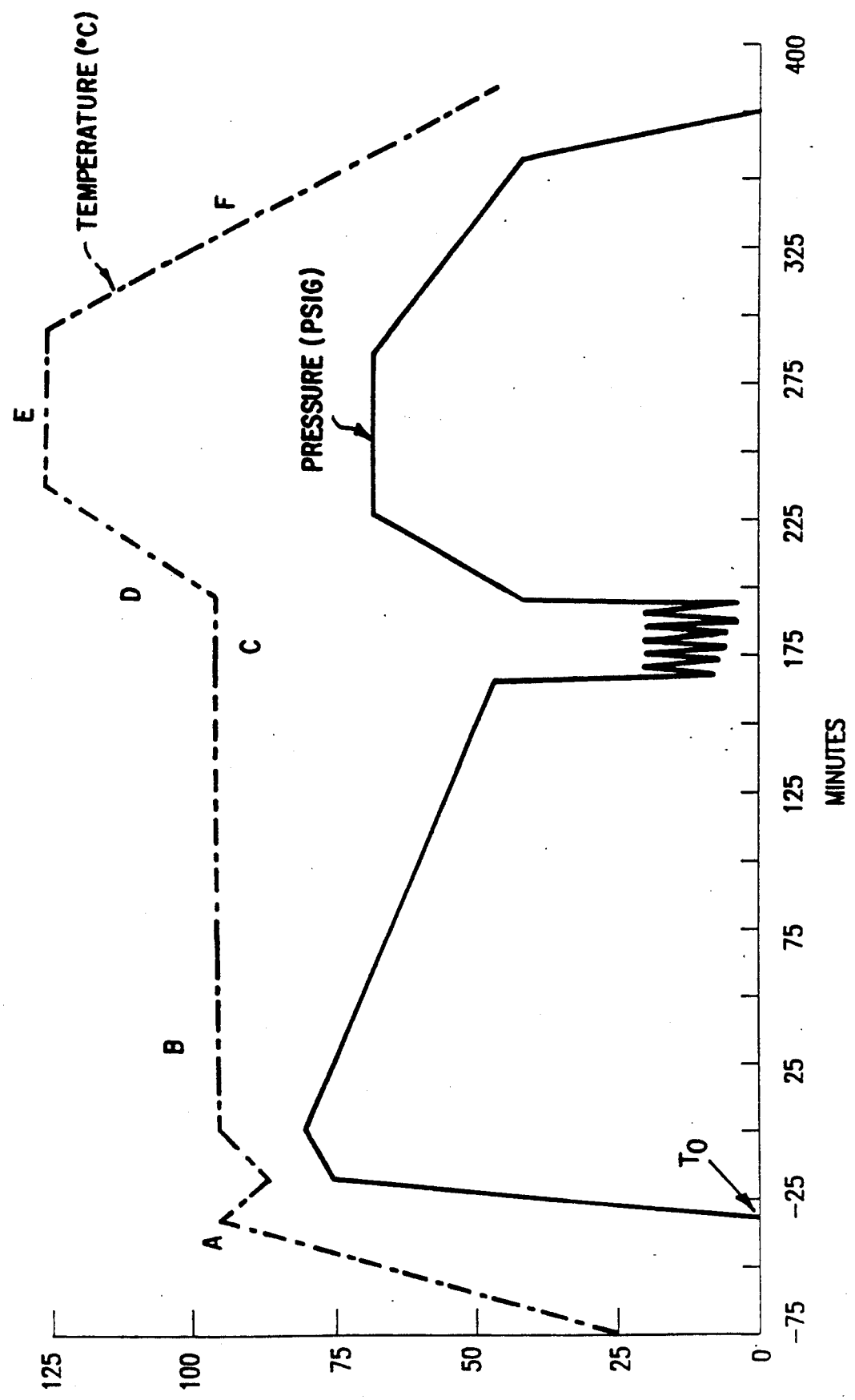
FIG. 1 depicts the time/temperature/pressure profile of the of the '108 patent employing venting prior to the heat-up phase.

In a preferred embodiment of the present invention the standard time/temperature/pressure profile (FIG. 1) is altered such that the removal of the unreacted volatile monomer is accomplished during, not before, the heat-up phase. Instead of venting there actor by a series of depressurizations/repressurizations which result in foam formation, the pressure of the reactor is maintained at the pressure observed after the exotherm phase, and an inert gas, for example, nitrogen, purge ("purge phase"; labelled "G" in the Figures) is maintained for a suitable time, preferably 20–30 minutes.

Figure 2:
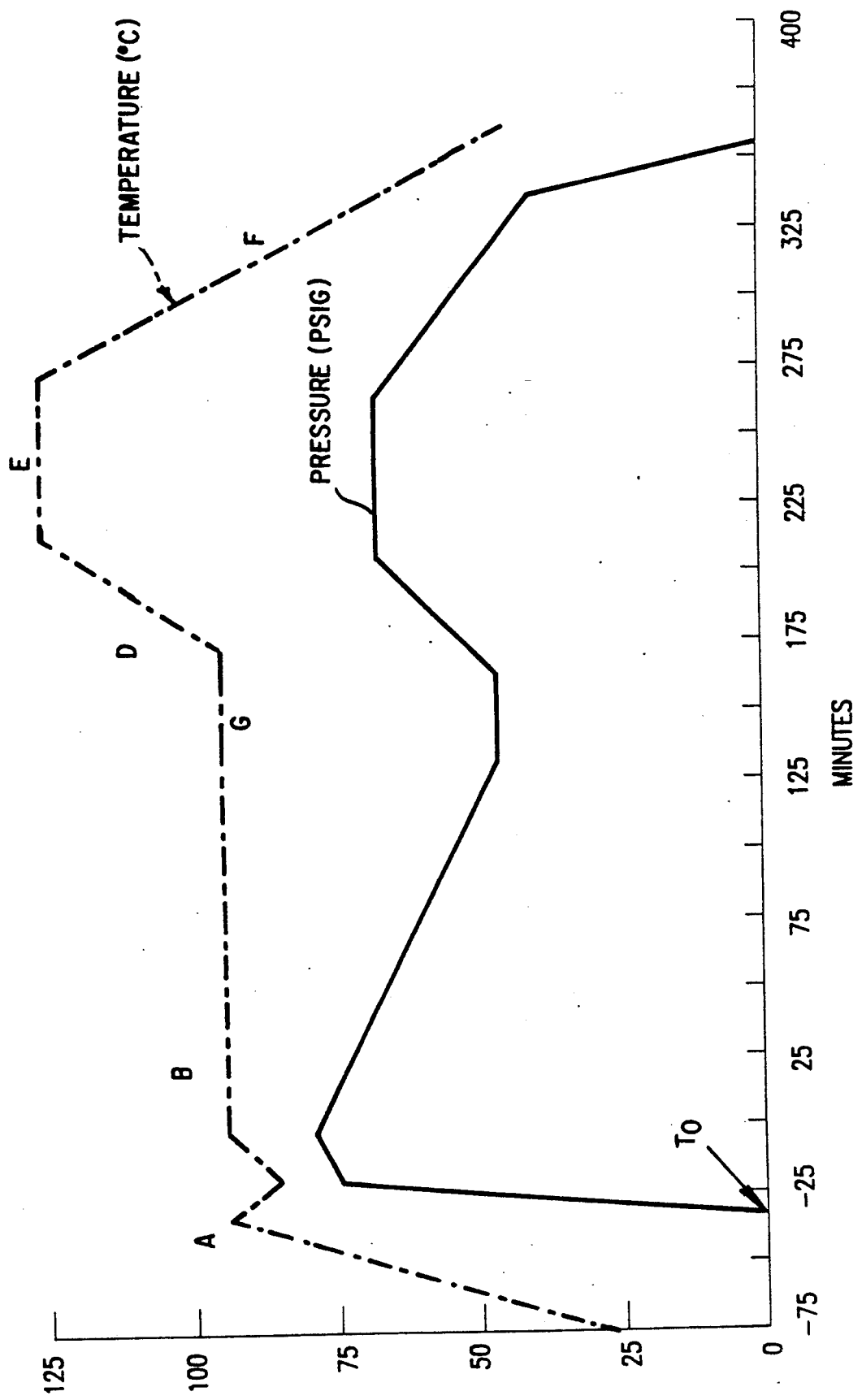
FIG. 2 depicts the time/temperature/pressure profile of Example 1 wherein a continuous inert gas purge is performed after the exotherm phase of the reaction prior to the heat up phase.

In the preferred embodiment shown in FIG. 2, the exotherm phase of the reaction is complete once the first initiator is practically consumed (i.e., 135 minutes after the start of the exothermic period). It is important that the removal of the unreacted volatile monomer occurs after the exotherm phase of the reaction at a high conversion of copolymer in order to achieve consistent molecular properties. In the depicted preferred embodiment the purging occurs immediately following the exotherm phase of the reaction and is followed by the heat-up phase. However, other time/temperature/pressure profiles may be used as long as the removal of the unreacted volatile monomer begins after the exotherm phase of the reaction In the preferred embodiment of FIG. 3, the reactants are first charged into the reaction vessel during the charge phase. The reaction is initiated and continues exothermically with an initial increase in temperature and pressure during the exotherm phase. The initial polymerization temperature of 95° C. is maintained for approximately 130 minutes. The exotherm ends after approximately 135 minutes and the heat-up phase to 125° C. begins immediately thereafter (i.e., there is no delay of 30 minutes formerly employed for the venting phase). During the heat-up phase the reactor is purged with an inert gas to remove the unreacted volatile monomer. The reactor temperature is maintained at 125° C. (final polymerization temperature) for approximately 60 minutes (high temperature phase) before the cool-down phase. In effect, the time consumed by the venting phase of the standard profile of FIG. 1 has been eliminated The following examples further illustrate specific features of the invention. Percentages are by weight unless otherwise indicated.

In each of the following examples, unless otherwise specified, a 100 gallon reactor was charged with material as follows: The Alkanol (sodium alkylnaphthalenesulfonate, available from E. I. Du Pont de Nemours) and tricalcium phosphate (TCP) were predispersed in 15 L of $H_2O$ for 30 minutes. This dispersion was then added to the remaining water. This final aqueous dispersion was charged into the reactor and then heated to 95°

C. The organic materials, i.e., styrene, initiators, benzoyl peroxide (BPO) and oo-t-butyl-o-(2-ethylhexyl)-monoperoxycarbonate (TBEC) were then mixed in a separate vessel. The pre-weighed butadiene was then added to the vessel. The organic material was then transferred into the reactor. The polymerization reaction was then allowed to proceed under the specified temperature and pressure profile.

EXAMPLE 1

A polymer was prepared in a 100 gallon reactor in accordance with the procedure described in example 15 of the '108 patent. The depressurization/repressurization venting was replaced by an inert gas purge in accordance with the present invention. The following reactants were used in this Example.

| Styrene | 105.3 kg |
| --- | --- |
| Butadiene | 15.4 kg |
| BPO (78%) | 4,290 g |
| TBEC | 550.1 g |
| $H_2O$ | 163.9 l |
| TCP | 1.927 kg |
| Alkanol | 49 g |

After 137 minutes from the start of the exotherm phase of the reaction, the pressure was noted and the vent controller was set to maintain this pressure. The nitrogen supply valve was opened to admit nitrogen to the reactor by way of the spray ball. The reactor was continuously purged for 30 minutes and then the nitrogen valve was closed as well as the reactor vent valve. The reactor temperature was then raised to about 125° C. and the polymerization was completed as described in Example 15 of the '108 patent. FIG. 2 represents the time/temperature/pressure profile used in Example 1.

EXAMPLE 2

Figure 3:
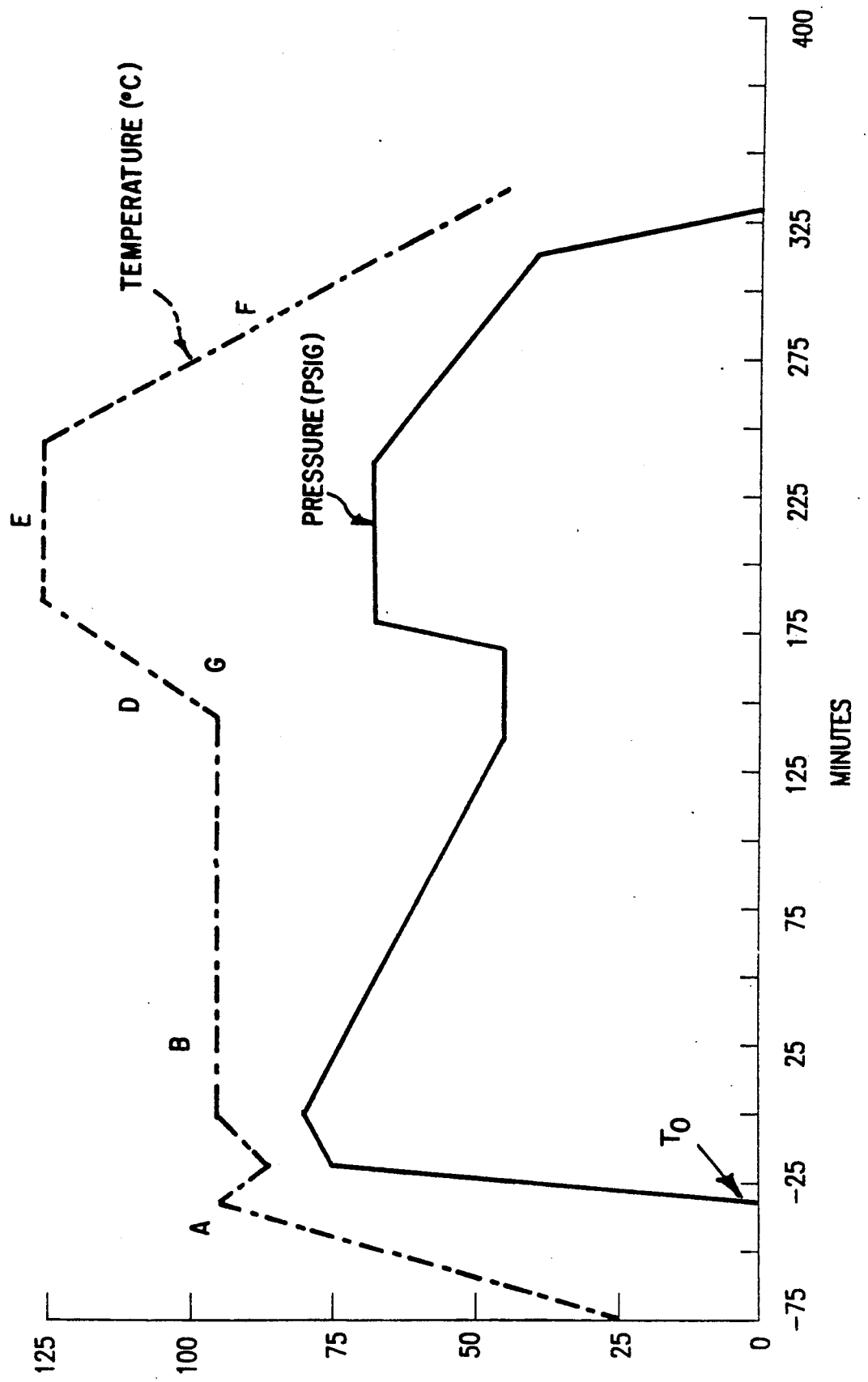
FIGS. 3-4 depict the time/temperature/pressure profiles used in Examples 2-3, respectively.

A polymer was prepared in a 100 gallon reactor in accordance with the procedure described in example 15 of the '108 patent. The depressurization/repressurization was replaced by an inert gas purge in accordance with the present invention. The purging procedure was performed during the heat-up to 125° C. At 137 minutes from the start of the exotherm phase, the reactor pressure was noted and the pressure controller was set to the reactor pressure and the heating to 125°. C. was commenced. Nitrogen was admitted through a spray ball at a flow rate of 60 SCFH and after 30 minutes of purging the reactor vent valve was closed and the nitrogen flow was stopped. The polymerization was completed at 125° C. as described in example 15 of the '108 patent. FIG. 3 represents the time/temperature/pressure profile for Example 2.

EXAMPLE 3

Figure 4:
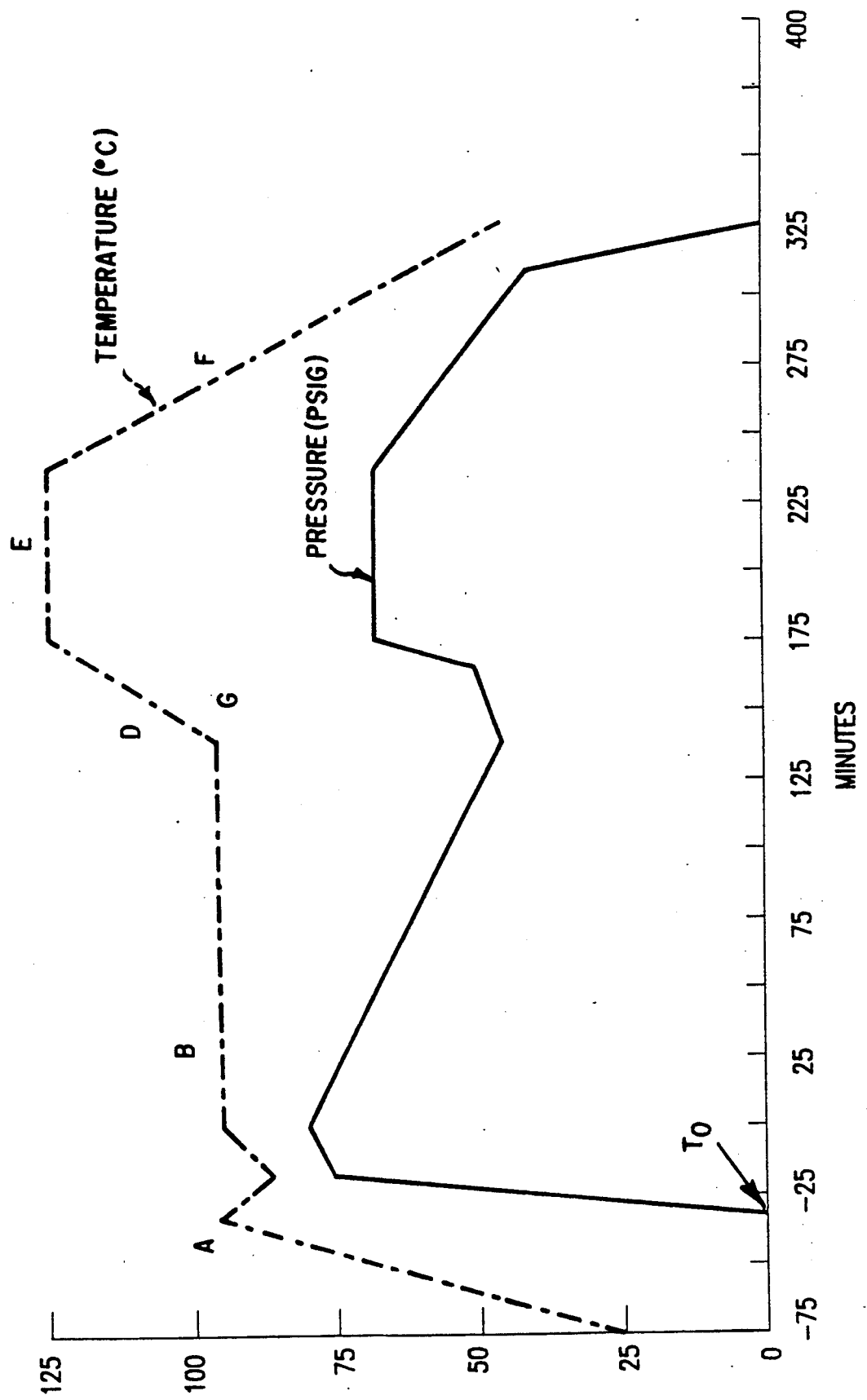

A polymer was prepared in a 100 gallon reactor in accordance with the procedure described in example 15 of the '108 patent. The depressurization/repressurization was replaced by an inert gas purge in accordance with the present invention. The purging procedure was performed during the heat-up to 125° C. The procedure of Example 2 was repeated except that during the purging, the pressure was increased one psi every 5 minutes. FIG. 4 represents the time/temperature/pressure profile for Example 3.

The characteristics of polymer materials produced according to the process of the '108 patent and Examples 1–3 are summarized in Table 1.

TABLE 1

| | Mw × 100 | Mn × 100 | D | Intr. Visc. | MI | Tg °C. | Bd ppm | Sty ppm | Benz ppm | VCH ppm | % ash | $D_{50}$ |
| --- | --- | --- | --- | --- | --- | --- | --- | --- | --- | --- | --- | --- |
| '108 pat. procedure | 125.0 to 137.0 | 19.6 to 21 | 5.9 to 6.8 | 36.5 to 38.5 | 21 to 29 | 56 to 58 | <4 | <800 | <100 | <150 | .02 to .06 | 260 to 600 |
| Ex 1 | 138.6 | 19.6 | 7.07 | 36.5 | 20.4 | 57.2 | 3.44 | 551 | 75 | 163 | .0145 | 282 |
| Ex 2 | 136.2 | 20.7 | 6.59 | 37.4 | 21.6 | 57.3 | 3.82 | 791 | 72 | 145 | .015 | 286 |
| Ex 3 | 131.6 | 19.0 | 6.92 | 37.7 | 22.6 | 56.2 | 1.39 | 668 | 73 | 119 | .02 | 505 |

As shown in Table I, the methods of the present invention provide polymer product with characteristics commensurate with the process of the '108 patent without the associated process drawbacks.

While the invention has been described with reference to a specific embodiment, it will be apparent to those skilled in the art that many alternatives, modifications, and variations may be made. Accordingly, it is intended to embrace all such alternatives, modifications and variations that may fall within the spirit and scope of the appended claims.

What is claimed is:

1. A process for removing residual butadiene from a copolymer composition formed by the reaction of butadiene and at least one second monomer in a reaction vessel, said process comprising purging said reaction vessel with an inert gas after the desired degree of polymerization has occurred, wherein said purge occurs while the reaction vessel is heated to the final polymerization temperature.

2. A process for forming a copolymer of butadiene and styrene, said process comprising:
   (a) charging a reaction vessel with the ingredients required for a suspension copolymerization procedure including butadiene and styrene;
   (b) initiating said copolymerization reaction;
   (c) after the exotherm phase of said reaction, heating said reaction vessel to a final polymerization temperature;
   (d) purging said reaction vessel with an inert gas during step (c); and
   (e) completing the polymerization at the final reaction temperature.

3. The process according to Claim 2 wherein said reaction vessel is first charged with an aqueous dispersion of sodium alkylnaphthalenesulfonate and tricalcium phosphate, and then said reaction vessel is charged with an organic mixture comprising styrene, benzoyl peroxide, oo-t-butyl-o-(2-ethylhexyl)-monoperoxycarbonate and butadiene.

4. The process of claim 2 wherein said reaction vessel is purged after at least about 75 percent by weight of the butadiene and the styrene are converted to a copolymer.

5. The process according to claim 2 wherein the rate and time of said purge is sufficient to reduce the residual butadiene in the recovered polymer to less than about 4 parts per million.

6. In a free radical process for the formation of a copolymer in a reaction vessel from a mixture comprising butadiene and at least one other olefinic co-monomer, the step, following substantial completion of the exotherm phase of the reaction and during at least a portion of the heat-up phase of the reaction, of purging the unreacted butadiene monomer from the vapor space in the reaction vessel by an inert gas stream.

7. A process for forming a copolymer of styrene and butadiene, said method comprising providing an aqueous phase comprising an aqueous mixture comprising water, styrene monomer, butadiene monomer, a suspension stabilizing agent, surfactant, a free radical polymerization initiator insoluble in water, soluble in said styrene monomer, soluble in said butadiene monomer and having a 1 hour half-life between about 50° C. and about 130° C., the ratio of said styrene monomer and said butadiene monomer being between about 80:20 and about 95:5 by weight, the weight proportion of water to the combination of said styrene monomer and said butadiene monomer is between about 0.8:1 and about 2:1, said suspension stabilizing agent consisting essentially of a finely-divided, difficultly water-soluble powder and a vapor phase comprising an inert gas and butadiene monomer, heating, concurrent with the removal of the butadiene monomer, said aqueous phase and said vapor phase to a temperature between about 50° C. and about 130° C. at a pressure between about 20 psi and about 140 psi, removing butadiene monomer from said vapor phase by purging said reaction vessel with an inert gas after at least about 75 percent by weight of said butadiene monomer and said styrene monomer in said aqueous phase are converted to a copolymer, and while purging said reaction vessel heating said aqueous phase at a temperature between about 50° C. and about 130° C. at a pressure between about 20 psi and about 140 psi until said styrene monomer and said butadiene monomer are copolymerized to form an aqueous suspension of discrete polymer particles having a Tg value of between about 45° C. and about 65° C., a weight average molecular weight of between about 10,000 and about 400,000, a molecule weight distribution of said copolymer between about 2 and about 9 and a butadiene monomer concentration of less than about 10 parts per million by weight.

* * * * *

UNITED STATES PATENT AND TRADEMARK OFFICE
CERTIFICATE OF CORRECTION

PATENT NO. : 5,200,485
DATED : April 6, 1993
INVENTOR(S) : William J. Dale, et al.

It is certified that error appears in the above-identified patent and that said Letters Patent is hereby corrected as shown below:

ON THE TITLE PAGE, in the title: Change "AND" to --AN--.

| Column | Line | |
|---|---|---|
| 1 | 4 | Change "AND" to --AN-- |
| 4 | 7 | Change "O" to --0--. |
| 4 | 19 | Change "there actor" to --the reactor--. |

Signed and Sealed this

Twenty-second Day of February, 1994

Attest:

BRUCE LEHMAN

Attesting Officer    Commissioner of Patents and Trademarks